(12) United States Patent
Lee et al.

(10) Patent No.: US 8,846,233 B2
(45) Date of Patent: Sep. 30, 2014

(54) BATTERY MODULE ASSEMBLY OF IMPROVED COOLING EFFICIENCY

(75) Inventors: Jin Kyu Lee, Busan (KR); Yongshik Shin, Daejeon (KR); Hee Soo Yoon, Daejeon (KR); BumHyun Lee, Seoul (KR); Dal Mo Kang, Daejeon (KR); Jongmoon Yoon, Daejeon (KR); Jaeseong Yeo, Daejeon (KR)

(73) Assignee: LG Chem, Ltd. (KR)

( * ) Notice: Subject to any disclaimer, the term of this patent is extended or adjusted under 35 U.S.C. 154(b) by 348 days.

(21) Appl. No.: 13/122,210

(22) PCT Filed: Sep. 23, 2009

(86) PCT No.: PCT/KR2009/005406
§ 371 (c)(1),
(2), (4) Date: Jun. 2, 2011

(87) PCT Pub. No.: WO2010/044553
PCT Pub. Date: Apr. 22, 2010

(65) Prior Publication Data
US 2012/0009457 A1 Jan. 12, 2012

(30) Foreign Application Priority Data
Oct. 14, 2008 (KR) ........................ 10-2008-0100635

(51) Int. Cl.
| | | |
|---|---|---|
| *H01M 10/02* | (2006.01) | |
| *H01M 10/50* | (2006.01) | |
| *B60L 11/18* | (2006.01) | |
| *H01M 10/6555* | (2014.01) | |
| *H01M 10/6557* | (2014.01) | |
| *H01M 10/647* | (2014.01) | |
| *H01M 10/6554* | (2014.01) | |
| *H01M 10/625* | (2014.01) | |
| *H01M 10/6556* | (2014.01) | |
| *H01M 10/6567* | (2014.01) | |

(52) U.S. Cl.
CPC ........ *B60L 11/1874* (2013.01); *H01M 10/5032* (2013.01); *Y02T 10/7055* (2013.01); *H01M 10/5055* (2013.01); *Y02T 10/7005* (2013.01); *H01M 10/5053* (2013.01); *H01M 10/5016* (2013.01); *H01M 10/5057* (2013.01); *H01M 10/5075* (2013.01); *Y02E 60/12* (2013.01); *H01M 10/5059* (2013.01); *Y02T 10/705* (2013.01); *B60L 11/1879* (2013.01)
USPC ........................... 429/120; 429/149; 429/156

(58) Field of Classification Search
CPC ........ H01M 2/02; H01M 10/50; H01M 10/42
USPC ........................................ 429/120, 148–160
See application file for complete search history.

(56) References Cited

U.S. PATENT DOCUMENTS 2,273,244 A 2/1942 Ambruster
4,500,612 A * 2/1985 Fujii et al. ..................... 429/434
(Continued)

FOREIGN PATENT DOCUMENTS

CN 1993843 A 7/2007
DE 102006059989 A1 6/2008
(Continued)

OTHER PUBLICATIONS

International Search Report, PCT/KR2009/005406, dated May 3, 2010.

*Primary Examiner* — Jonathan Crepeau
*Assistant Examiner* — Jacob Buchanan
(74) *Attorney, Agent, or Firm* — Lerner, David, Littenberg, Krumholz & Mentlik, LLP

(57) ABSTRACT

Disclosed herein is a battery module assembly including a plurality of battery modules, each including a plurality of battery cells or unit modules mounted in a module case in a state in which the battery cells or the unit modules are connected in series to each other, wherein the battery modules are arranged adjacent to each other in the lateral direction in a state in which the battery modules are electrically connected to each other, and a cooling member including a coolant conduit to allow a liquid coolant to flow therealong is mounted at the outside of each of the battery modules.

15 Claims, 5 Drawing Sheets

(56) References Cited

U.S. PATENT DOCUMENTS

| | | | |
|---|---|---|---|
| 4,574,112 A * | 3/1986 | Breault et al. | 429/434 |
| 6,087,036 A * | 7/2000 | Rouillard et al. | 429/66 |
| 6,130,003 A * | 10/2000 | Etoh et al. | 429/99 |
| 6,512,347 B1 * | 1/2003 | Hellmann et al. | 320/107 |
| 7,021,823 B2 * | 4/2006 | Roepke et al. | 374/152 |
| 2004/0137298 A1 * | 7/2004 | Sugiura et al. | 429/32 |
| 2006/0214641 A1 * | 9/2006 | Cho | 320/150 |
| 2007/0126396 A1 * | 6/2007 | Yang | 320/112 |

FOREIGN PATENT DOCUMENTS

| | | |
|---|---|---|
| JP | 06-333607 | 12/1994 |
| JP | 08111244 A | 4/1996 |
| JP | 09245809 A | 9/1997 |
| JP | 10106521 A | 4/1998 |
| JP | 2000012071 A | 1/2000 |
| JP | 2000-348781 A | 12/2000 |
| JP | 2003132856 A | 5/2003 |
| JP | 2006-216303 A | 8/2006 |
| KR | 20070057344 A | 6/2007 |
| KR | 20070112489 A | 11/2007 |
| KR | 20070112490 A | 11/2007 |
| KR | 20080044158 A | 5/2008 |
| WO | 9831059 A1 | 7/1998 |

* cited by examiner

BATTERY MODULE ASSEMBLY OF IMPROVED COOLING EFFICIENCY

CROSS REFERENCE TO RELATED APPLICATIONS

The present application is a national phase entry under 35 U.S.C. §371 of International Application No. PCT/KR2009/005406, filed Sep. 23, 2009, published in Korean, which claims priority from Korean Patent Application No. 10-2008-0100635, filed Oct. 14, 2008. The disclosures of said applications are incorporated by reference herein.

TECHNICAL FIELD

The present invention relates to a battery module assembly with improved cooling efficiency, and, more particularly, to a battery module assembly including a plurality of battery modules, each including a plurality of battery cells or unit modules mounted in a module case in a state in which the battery cells or the unit modules are connected in series to each other, wherein the battery modules are arranged adjacent to each other in the lateral direction in a state in which the battery modules are electrically connected to each other, and a cooling member including a coolant conduit to allow a liquid coolant to flow therealong is mounted at the outside of each of the battery modules.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit cell) of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

In order for the middle or large-sized battery module to provide power and capacity required by a predetermined apparatus or device, it is necessary for the middle or large-sized battery module to be configured to have a structure in which a plurality of battery cells are electrically connected in series to each other, and the battery cells are stable against external force.

Also, the battery cells constituting the middle or large-sized battery module are secondary batteries which can be charged and discharged. Consequently, a large amount of heat is generated from the high-power, large-capacity secondary batteries during the charge and discharge of the batteries. If the heat, generated from the battery cells during the charge and discharge of the battery cells, is not effectively removed, the heat accumulates in the battery cells with the result that deterioration of the battery cells is accelerated. According to circumstances, the battery cells may catch fire or explode. For this reason, a cooling system is needed in a battery pack for vehicles, which is a high-power, large-capacity battery, to cool battery cells mounted in the battery pack.

Generally, a hybrid electric vehicle uses a power from a battery pack during starting of the hybrid electric vehicle and oil, such as gasoline, during traveling of the hybrid electric vehicle. As a result, an amount of heat generated from the battery pack is small, and therefore, a cooling system using air is generally used in a battery pack for vehicles, which is applied to the hybrid electric vehicle.

On the other hand, a plug-in hybrid electric vehicle uses a power from a battery pack for vehicles during early traveling of the plug-in hybrid electric vehicle as well as during starting of the plug-in hybrid electric vehicle. As a result, the size of the battery pack is increased, and the number of charging and discharging the battery pack is relatively increased. Consequently, an amount of heat generated from the battery pack is large.

Consequently, there is a high necessity for technology to fundamentally solve the above problems, thereby improving cooling efficiency of a battery module assembly included in a battery pack for vehicles.

DISCLOSURE

Technical Problem

Therefore, the present invention has been made to solve the above problems, and other technical problems that have yet to be resolved.

The inventors of the present application have found that, in a case in which a cooling member including a coolant conduit to allow a liquid coolant to flow therealong is mounted at the outside of each battery module constituting a battery module assembly, it is possible to greatly improve cooling efficiency of each battery module and thus greatly improve life span and reliability of the battery module assembly. The present invention has been completed based on these findings.

Also, in a case in which the structure or number of cooling conduits is changed, it is possible to variously dispose a coolant inlet port and a coolant outlet port and to flexibly design a cooling system of the battery module assembly.

Technical Solution

In accordance with one aspect of the present invention, the above and other objects can be accomplished by the provision of a battery module assembly including a plurality of battery modules, each including a plurality of battery cells or unit modules mounted in a module case in a state in which the battery cells or the unit modules are connected in series to each other, wherein the battery modules are arranged adjacent to each other in the lateral direction in a state in which the battery modules are electrically connected to each other, and a cooling member including a coolant conduit to allow a liquid coolant to flow therealong is mounted at the outside of each of the battery modules.

That is, in the battery module assembly according to the present invention, the cooling member including the coolant conduit, along which the liquid coolant flows, is mounted at the outside of each of the battery modules, and therefore, it is possible to greatly improve cooling efficiency as compared with a battery module assembly using a conventional air cooling type cooling system.

Also, it is possible to change the area of the coolant conduit regions based on the amount of heat generated from the battery modules and to configure a flexible cooling system through proper selection of a liquid coolant.

In a preferred example, the cooling member may be mounted at the interface between the battery modules and/or at the outside of the outermost battery module.

That is, the cooling member may be mounted at each of the interfaces between the battery modules or at only the outside of the outermost battery module. Alternatively, the cooling member may be mounted at each of the interfaces between the battery modules and at the outside of the outermost battery module.

Of course, such a cooling member mounting structure may be selectively used based on a desired cooling level.

Preferably, the cooling member is configured to have a structure in which one or more coolant conduits are mounted at a plate body formed in a shape corresponding to the outside of each of the battery modules.

That is, one or more coolant conduits may be mounted at the outside of the plate body in a predetermined shape, and it is possible to flexibly configure a cooling system of the battery module assembly based on the number of the coolant conduits.

In the above structure, the coupling structure of the plate body and the cooling conduits is not particularly restricted so long as the coupling between the plate body and the cooling conduits is easily achieved. For example, the plate body may be provided at the outside thereof with a continuous groove corresponding to the width of each of the coolant conduits, and each of the coolant conduits may be fixedly disposed in the groove.

In this case, each of the coolant conduits is mounted at the plate body so that a coolant inlet port and a coolant outlet port protrude from the plate body. Consequently, a coolant is easily introduced through the coolant inlet port, flows along the coolant conduits to cool the battery modules disposed adjacent to the coolant conduits, and is easily discharged to the outside through the coolant outlet port.

In the above structure, the positions of the coolant inlet port and the coolant outlet port may be changed based on the structure of an external device in which the battery module assembly is mounted. For example, the coolant inlet port and the coolant outlet port may be located in the same direction or in opposite directions.

Meanwhile, each of the coolant conduits includes regions bent to form a repeated shape.

Specifically, each of the coolant conduits may be bent in a repeated shape to maximize the interface area between each of the coolant conduits and an adjacent battery module and thus improve cooling efficiency. For example, each of the coolant conduits may be repeatedly bent in a planar '[' shape in a zigzag fashion. Alternatively, each of the coolant conduits may be bent in the same coil shape as in an electric heating pad.

In a preferred example, one or more thermally conductive fixing members configured to contact each of the battery modules may be connected to each of the coolant conduits so as to improve thermal conductivity from each of the battery modules to the cooling member. The thermally conductive fixing members are in direct contact with each of the battery modules, and therefore, it is possible to directly transfer the low temperature of the liquid coolant flowing along the coolant conduits to each of the battery modules.

As an example of the above structure, the thermally conductive fixing members may be mounted to fix each of the coolant conduits to the groove of the plate body.

For example, the coolant conduits may be inserted into the groove formed at the plate body of the cooling member, and the thermally conductive fixing members may be easily fixed to the groove of the plate body while the thermally conductive fixing members are mounted from above the cooling conduits.

The structure of each of the thermally conductive fixing members is not particularly restricted so long as the thermally conductive fixing members easily fix the cooling conduits. For example, each of the thermally conductive fixing members may include a plate and an elastic body mounted to the plate so that the elastic body surrounds at least a portion of the outside of each of the cooling conduits.

In the above structure, the elastic body may be configured in the shape of a ring having an opening formed at one side thereof in vertical section. Consequently, it is possible for the elastic body to more effectively fix the cooling conduits to the groove of the plate body while elastically surrounding the cooling conduits.

Preferably, the plate body is provided with a depression, corresponding to each of the thermally conductive fixing members, to allow each of the thermally conductive fixing members to be mounted therein. Consequently, each of the thermally conductive fixing members is mounted in the depression of plate body, thereby achieving secure coupling between each of the thermally conductive fixing members and the depression of plate body.

The coolant conduit may be mounted at one side or each side of the plate body.

That is, the coolant conduit may be selectively mounted at one side or each side of the plate body based on a desired temperature at which the battery module assembly is to be cooled. Preferably, the coolant conduit is mounted at each side of the plate body to more effectively cool the battery modules.

In the above structure, the coolant conduits may be independently mounted at opposite sides of the plate body, and coolant inlet ports and coolant outlet ports of the coolant conduits may be disposed in the same direction or in different directions.

In the structure in which the coolant conduits may be independently mounted at opposite sides of the plate body, it is possible to flexibly arrange the coolant inlet ports and coolant outlet ports of the coolant conduits, and therefore, it is possible to flexibly design the cooling structure of the battery module assembly.

Meanwhile, the plate body may be made of an insulative material or a thermally conductive material. For example, the plate body may be made of a rubber material.

Specifically, in a case in which the plate body is made of an electrically insulative material, the plate body remains isolated from the battery module. On the other hand, in a case in which the plate body is made of a thermally conductive material, the plate body easily transfer heat generated from the battery module, thereby effectively cooling the battery module.

The rubber material is preferably used since the rubber material isolates the battery modules from each other and, at the same time, elastically protects the battery module assembly from external force.

The material for the coolant conduit is not particularly restricted so long as the coolant conduit exhibits high thermal conductivity. For example, the coolant conduit may be made of a metal material.

The kind of the liquid coolant is not particularly restricted so long as the liquid coolant exhibits high cooling efficiency while easily flowing along the coolant conduit. Fort example, the liquid coolant may be water, which can be obtained at low expenses.

The battery module assembly may include two or more cooling members, and coolant conduits of the cooling members may be connected to each other so that a coolant introduced through one of the cooling members continuously flows to the other cooling member.

The structure in which the coolant conduits are connected to each other may be variously configured based on how the coolant conduits are connected to each other. For example, one coolant inlet port and one coolant outlet port may be provided, or one coolant inlet port and two coolant outlet ports may be provided. As a result, it is possible to flexibly configure the cooling system of the battery module assembly.

Each of the battery cells may be a plate-shaped battery cell having a small thickness and a relatively large width and length so that, when a plurality of battery cells is stacked to construct the battery module, the total size of the battery module is minimized. In a preferred example, the battery cell may be a second battery configured to have a structure in which an electrode assembly is mounted in a battery case formed of a laminate sheet including a resin layer and a metal layer, and electrode terminals protrude upper end lower end of the battery case. Specifically, the battery cell may be configured to have a structure in which the electrode assembly is mounted in a pouch-shaped case formed of an aluminum laminate sheet. The secondary battery with the above-stated construction may be referred to as a pouch-shaped battery cell.

For reference, the term 'battery module' as used in the specification includes the structure of a battery system configured to have a structure in which two or more chargeable and dischargeable battery cells or unit modules are mechanically coupled to each other and, at the same time, electrically connected to each other so as to provide high-power, large-capacity electricity. Therefore, the battery module itself may constitute a single apparatus or a part of the large-sized apparatus. For example, a plurality of small-sized battery modules may be connected to each other to constitute a large-sized battery module. Alternatively, a small number of battery cells may be connected to each other to constitute a unit module, and a plurality of the unit modules may be connected to each other.

Meanwhile, the unit module may be configured to have various structures, a preferred example of which will be described hereinafter.

The unit module is configured to have a structure in which a plurality of plate-shaped battery cells, each of which has electrode terminals formed at the upper and lower ends thereof, is connected in series to each other. The unit module may include two or more battery cells arranged in a stacked structure in which connection parts between the electrode terminals of the battery cells are bent and high-strength cell covers coupled to each other to cover the outsides of the battery cells excluding the electrode terminals of the battery cells.

Two or more battery cells are covered by the high-strength cell covers which are made of a synthetic resin or metal material to constitute a unit module. The high-strength cell covers protect the battery cells, which have low mechanical strength, and, in addition, restrain the change in repetitive expansion and contraction during charge and discharge of the battery cells, thereby preventing sealing portions of the battery cells from being separated from each other. Consequently, it is possible to manufacture a battery module assembly exhibiting better safety.

The battery cells are connected in series and/or in parallel to each other in one unit module, or the battery cells of one unit module are connected in series and/or in parallel to the battery cells of another unit module. In a preferred example, a plurality of unit modules may be manufactured by coupling electrode terminals of the battery cells to each other, while arranging the battery cells in series in the longitudinal direction, so that the electrode terminals of the battery cells are successively adjacent to each other, bending the battery cells by twos or more so that the battery cells are stacked, and covering the stacked battery cells by predetermined numbers with the cell covers.

Coupling between the electrode terminals may be achieved using various methods, such as welding, soldering, and mechanical coupling. Preferably, coupling between the electrode terminals is achieved by welding.

A plurality of battery cells or unit modules, which is stacked in high integration while electrode terminals of the battery cells or the unit modules are connected to each other, may be vertically mounted in separable upper and lower cases that are configured to be coupled to each other in the assembly-type coupling structure to constitute a rectangular battery module.

The details of a unit module and a rectangular battery module manufactured using a plurality of unit modules are disclosed in Korean Patent Application No. 2006-45443 and No. 2006-45444, which have been filed in the name of the applicant of the present application and the disclosure of which is incorporated herein by reference.

According to circumstances, each of the battery modules may be further provided with a thermally conductive member extending to at least a region contacting the cooling member to improve thermal conductivity from each of the battery modules to the cooling member. The thermally conductive member may be configured to have various structures. For example, the thermally conductive member may be formed of a metal sheet.

The battery module assembly according to the present invention includes a plurality of battery cells in order to provide high power output and large capacity. Consequently, the battery module assembly is preferably used as a power source for electric vehicles, hybrid electric vehicles or plug-in hybrid electric vehicles in which high-temperature heat generated during the charge and discharge of the battery cells is a serious safety concern.

In particular, as previously described, the plug-in hybrid electric vehicles use a power from a battery module assembly for vehicles during early traveling of the plug-in hybrid electric vehicle as well as during starting of the plug-in hybrid electric vehicles. As a result, the number of charging and discharging the battery pack is relatively increased, and therefore, an amount of heat generated from the battery module assembly is increased. The battery module assembly according to the present invention is configured to have a water cooling type structure, thereby exhibiting high cooling efficiency and thus easily solving the problem related to the heat generation.

In accordance with another aspect of the present invention, there is provided a battery module including a plurality of battery cells, wherein the battery cells are arranged adjacent to each other in the lateral direction in a state in which the battery cells are electrically connected to each other, and a cooling member including a coolant conduit to allow a liquid coolant to flow therealong is mounted at the outside of each of the battery cells.

In the battery module including only the battery cells with the above-stated construction, the cooling member including the coolant conduit is mounted at the outside of each of the battery cells. Consequently, the battery cells are effectively cooled by the liquid coolant flowing in the coolant conduit.

In accordance with a further aspect of the present invention, there is provided a cooling member mounted to the outside of a battery cell or a battery module to cool the battery cell or the battery module.

Specifically, the cooling member may be configured to have a structure in which a continuous groove is formed at a plate body formed in a shape corresponding to the outside of the battery cell or the battery module, and a coolant conduit to allow a liquid coolant to flow therealong is fixedly mounted in the groove.

In the above structure, one or more thermally conductive fixing members configured to contact the battery cell or the battery module may be connected to the coolant conduit to improve thermal conductivity from the battery cell or the battery module to the cooling member.

As previously described, the thermally conductive fixing members are configured to be in contact with the battery module, thereby effectively removing heat generated from the battery module.

As another example, the coolant conduit may be mounted at each side of the plate body so that a coolant inlet port and a coolant outlet port protrude from the plate body.

Specifically, the liquid coolant is introduced through the coolant inlet port protruding from the plate body, flows along the coolant conduits mounted at the opposite sides of the plate body, and is discharged to the outside through the coolant outlet port protruding from the plate body, thereby effectively cooling the battery cells or the battery module.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
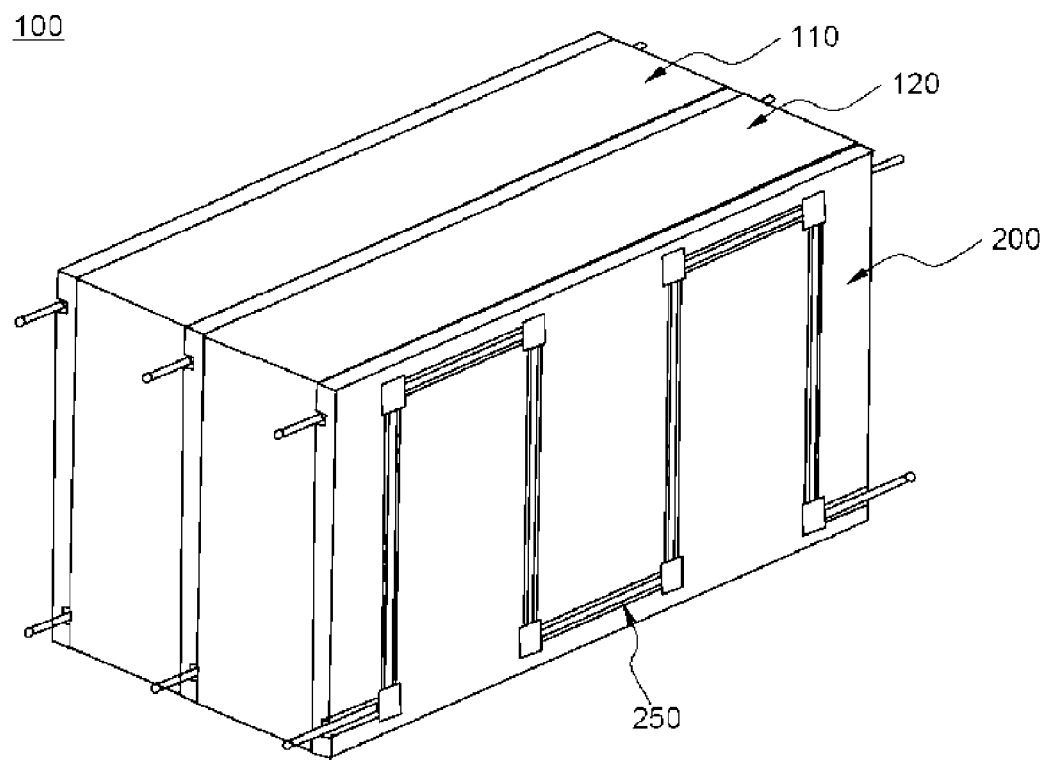
FIG. 1 is a typical view illustrating a battery module assembly according to an embodiment of the present invention.

FIG. 1 is a typical view illustrating a battery module assembly according to an embodiment of the present invention.

Referring to FIG. 1, a battery module assembly 100 includes two battery modules 110 and 120 arranged adjacent to each other in the lateral direction in a state in which the battery modules 110 and 120 are electrically connected to each other and three cooling members 200 mounted at the battery modules 110 and 120.

The cooling members 200 are mounted at the interface between the battery modules 110 and 120 and at the outsides of the battery modules 110 and 120. Each of the cooling members 200 includes coolant conduits 250 along which a liquid coolant flows.

Figure 2:
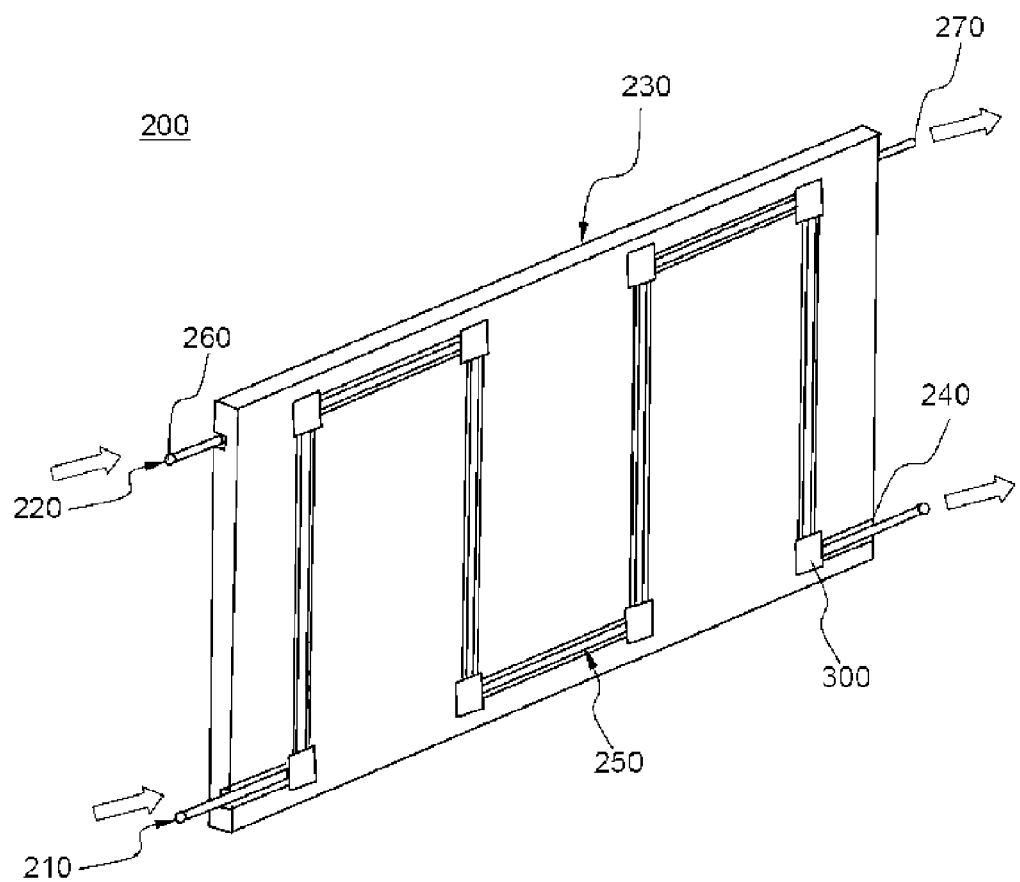
FIG. 2 is a typical view illustrating a cooling member of FIG. 1.

FIG. 2 is a typical view illustrating one of the cooling members shown in FIG. 1.

Referring to FIG. 2 together with FIG. 1, the cooling member 200 is configured to have a structure in which two coolant conduits 210 and 220 are mounted at opposite sides of a plate body 230 formed in a shape corresponding to the outside of the battery module 120, and coolant inlet ports 260 and coolant outlet ports 270 protrude outward from the plate body 230 in a state in which the coolant inlet ports 260 and the coolant outlet ports 270 are disposed at corresponding ends of the coolant conduits 250 in opposite directions.

Also, each of the coolant conduits 250 is disposed in a groove 240, having a size corresponding to the width of each of the coolant conduits 250, formed at the outside of the plate body 230. Each of the coolant conduits 250 includes regions bent to repeatedly form a planar '[' shape so as to maximize an interface area between each of the coolant conduit 250 and the plate body 230.

Meanwhile, depressions (not shown) are formed at the bent regions of the plate body 230 in a state in which each of the depressions has a size corresponding to that of a thermally conductive fixing member 300. The thermally conductive fixing members 300 fix the respective bent regions of the coolant conduit 250 disposed in the groove 240 of the plate body 230.

In addition, the thermally conductive fixing members 300 are disposed in direct contact with the outside of the battery module 120, thereby improving thermal conductivity from the battery modules 110 and 120 to the cooling members 230.

Figure 3:
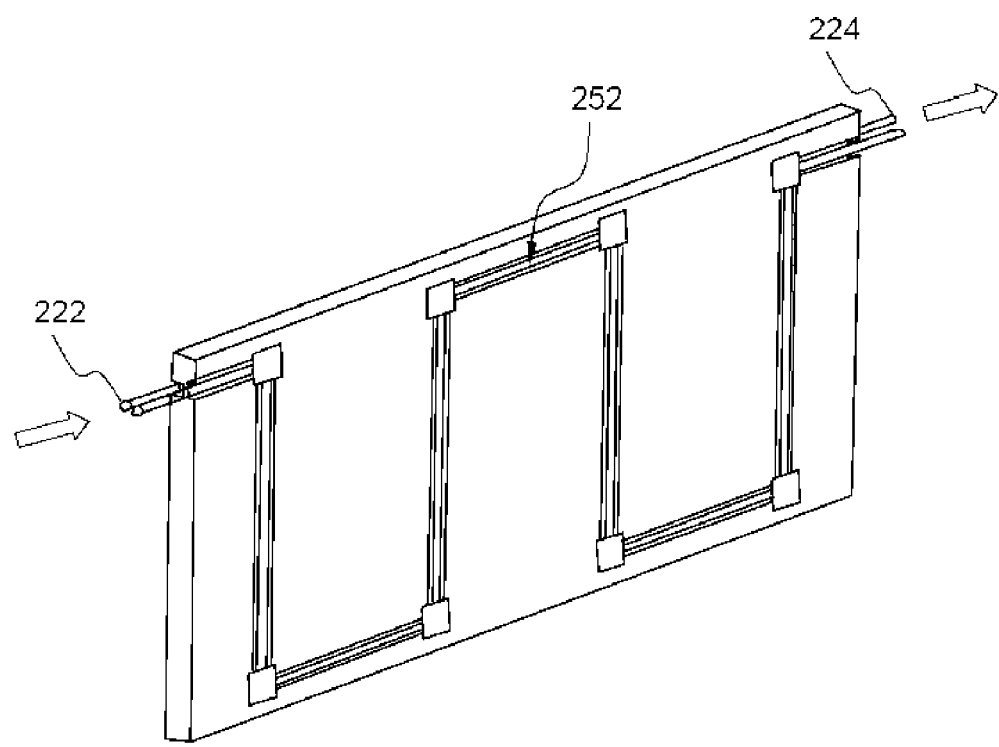
FIG. 3 is a typical view illustrating a cooling member according to another embodiment of the present invention.

FIG. 3 is a typical view illustrating a cooling member according to another embodiment of the present invention.

Referring to FIG. 3, the cooling member according to this embodiment is identical to the cooling member according to the previous embodiment except that coolant inlet ports 222 and coolant outlet ports 224 are disposed at ends of the coolant conduits 252 in the same direction, and therefore, a detailed description thereof will not be given.

Figure 4:
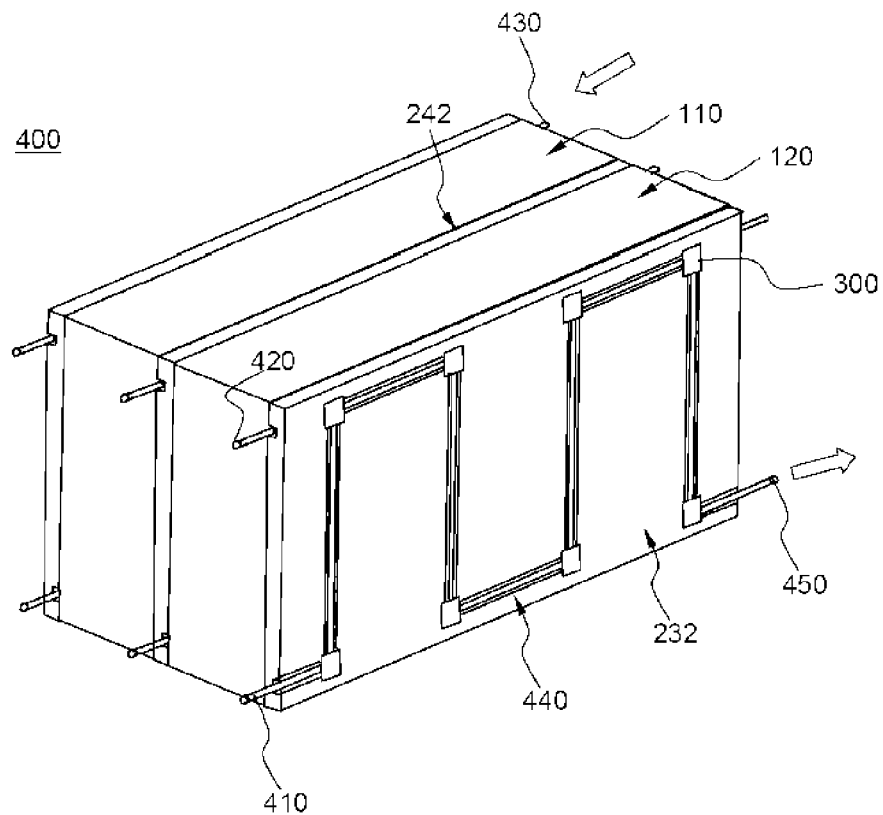
FIGS. 4 and 5 are typical view illustrating the connection of coolant conduits according to various embodiments of the present invention in the battery module assembly of FIG. 1.
Figure 5:
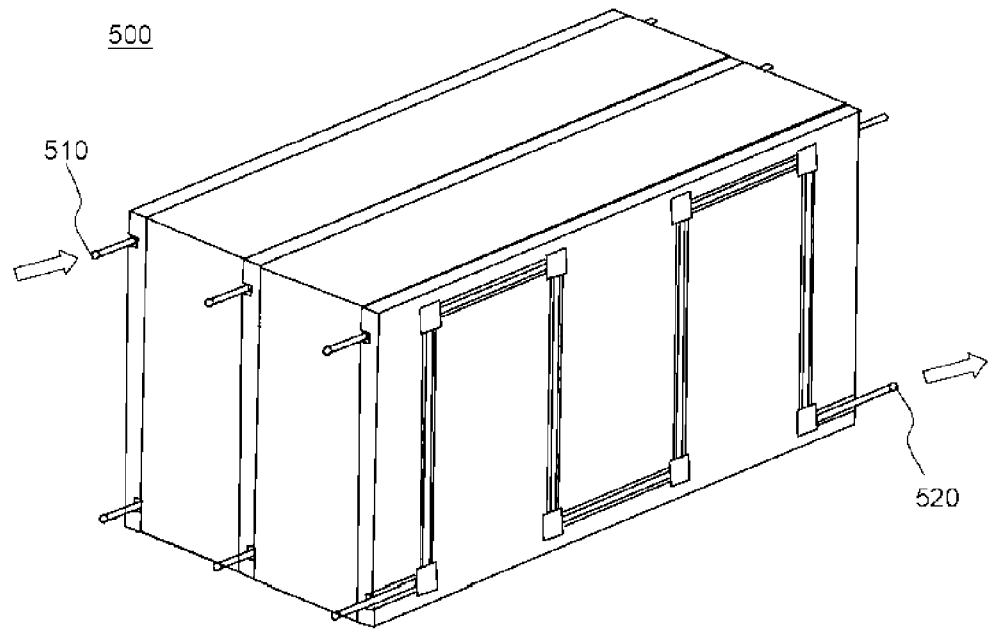

FIGS. 4 and 5 are typical view illustrating the connection of coolant conduits according to various embodiments of the present invention in the battery module assembly of FIG. 1.

Referring first to FIG. 4, a battery module assembly 400 includes two battery modules 110 and 120 and three cooling members 230. Coolant conduits 420 and 410 of the respective cooling members 232 and 242 are connected to each other. Also, coolant inlet ports 430 and coolant outlet ports 450 are disposed at the right-side upper end and the right-side lower end of the battery module assembly 400 in the same direction.

Consequently, a liquid coolant is introduced into the battery module assembly 400 through the coolant inlet port 430 disposed at the right-side upper end of the battery module assembly 400, sequentially flow along coolant conduits (not shown) disposed at the outside of the first outermost battery module 110, coolant conduits (not shown) disposed at the interface between the battery modules 110 and 120 and the coolant conduit 410 of the cooling member 232 disposed at the outside of the second outermost battery module 120, and is discharged to the outside through the coolant outlet port 450 disposed at the right-side lower end of the battery module assembly 400.

Referring now to FIG. 5, a battery module assembly 500 is configured so that a coolant inlet port 510 and a coolant outlet port 520 are disposed at a left side portion and a right side portion of the battery module assembly 500, respectively, in opposite directions.

Figure 6:
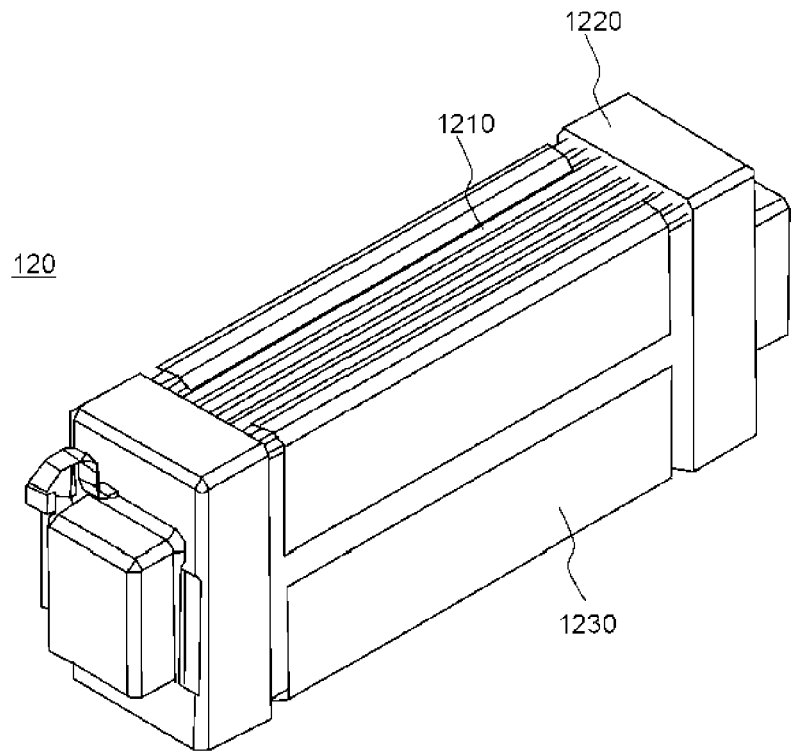
FIG. 6 is a perspective view illustrating a battery module of FIG. 4.

FIG. 6 is a perspective view typically illustrating one of the battery modules of FIG. 4.

Referring to FIG. 6 together with FIG. 2, the battery module 120 is configured to have a structure in which eight battery cells 1210 are mounted in a module case 1220 in a state in which the battery cells 1210 are stacked in the lateral direction without gaps between the respective battery cells 1210. The cooling member 200 of FIG. 2 is attached to the outside of the outermost battery cell. In order to improve thermal conductivity to the cooling member 200, the battery module 120 may be provided with a thermally conductive plate 1230 extending to at least a region contacting the cooling member 200.

Figure 7:
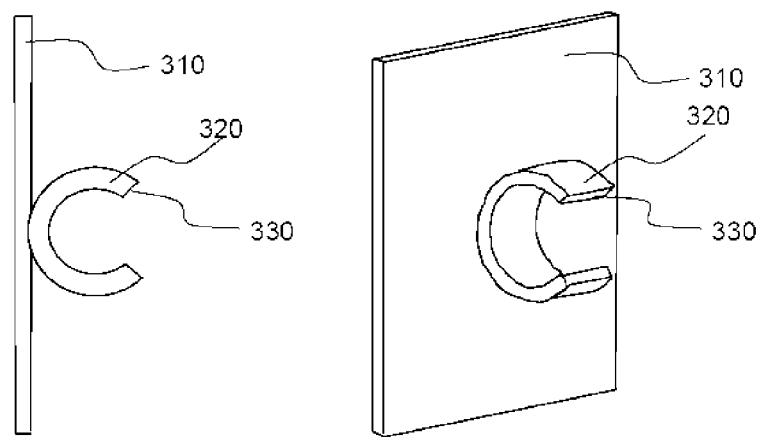
FIG. 7 is a side view illustrating a thermally conductive fixing member of FIG. 4 including a perspective view of the thermally conductive fixing member.

FIG. 7 is a side view typically illustrating one of the thermally conductive fixing members shown in FIG. 4 including a perspective view of the thermally conductive fixing member.

Referring to FIG. 7 together with FIG. 4, the thermally conductive fixing member 300 includes a plate 310 and an elastic body mounted to the plate 310, the elastic body being formed in a shape to surround the outside of the cooling conduit 440 of FIG. 4. The elastic body is configured in the shape of a ring 320 having an opening 330 formed at one side thereof in vertical section.

Consequently, the ring 320 fixes the coolant conduit with in the groove of the plate body 232 while surrounding the coolant conduit 440 through the opening 330.

INDUSTRIAL APPLICABILITY

As is apparent from the above description, the battery module assembly according to the present invention is configured to have a structure in which a cooling member including a coolant conduit to allow a liquid coolant to flow therealong is mounted at the outside of a battery module, thereby greatly improving cooling efficiency of the battery module and thus greatly improving life span and reliability of the battery module.

Also, the cooling conduit is formed to have various structures, and therefore, it is possible to easily and flexibly configure a cooling system of the battery module assembly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module assembly comprising battery modules, each of the battery modules comprising secondary battery cells, or unit modules including secondary battery cells, mounted in a module case in a state in which the secondary battery cells or the unit modules are connected in series to each other,
    wherein the battery modules are arranged in a lateral direction in a state in which the battery modules are electrically connected to each other; and
    cooling members, wherein each of the cooling members comprises a plate body and coolant conduits to allow a liquid coolant to flow therealong, and wherein the cooling members are located outside of each of the battery modules,
    wherein the coolant conduits are independently located at opposite sides of the plate body,
    wherein coolant conduits of the cooling members are connected to each other so that a coolant introduced through one of the cooling members continuously flows to another of the cooling members,
    wherein each of the cooling members has the coolant conduits mounted at the plate body and formed in a shape corresponding to an outside of each of the battery modules,
    wherein the plate body further comprises continuous grooves formed in the opposite sides thereof, each of the continuous grooves corresponding to a width of a coolant conduit, and each of the coolant conduits fixedly disposed in a corresponding continuous groove,
    wherein one or more thermally conductive fixing members configured to contact each of the battery modules are connected to each of the coolant conduits so as to improve thermal conductivity from each of the battery modules to the cooling member, and
    wherein the thermally conductive fixing members are mounted to fix each of the coolant conduits to the groove of the plate body.

2. The battery module assembly according to claim 1, wherein each of the cooling members is mounted at an interface between the battery modules and/or at an outside of an outermost battery module.

3. The battery module assembly according to claim 1, wherein each of the coolant conduits comprises a coolant inlet port and a coolant outlet port protruding from the plate body.

4. The battery module assembly according to claim 3, wherein coolant inlet ports and coolant outlet ports of the coolant conduits are located adjacent to each other or away from each other.

5. The battery module assembly according to claim 1, wherein each of the coolant conduits comprises regions bent to form a repeated shape.

6. The battery module assembly according to claim 1, wherein each of the thermally conductive fixing members comprises a plate and an elastic body mounted to the plate, the elastic body being formed in a shape corresponding to each of the cooling conduits.

7. The battery module assembly according to claim 6, wherein the elastic body is configured in the shape of a ring having an opening formed at one side thereof in vertical section.

8. The battery module assembly according to claim 1, wherein the plate body is provided with a depression, corresponding to each of the thermally conductive fixing members, to allow each of the thermally conductive fixing members to be mounted therein.

9. The battery module assembly according to claim 1, wherein the plate body is made of an insulative material or a thermally conductive material.

10. The battery module assembly according to claim 9, wherein the plate body is made of a rubber material.

11. The battery module assembly according to claim 1, wherein the coolant conduits are made of a metal material.

12. The battery module assembly according to claim 1, wherein the liquid coolant comprises water.

13. The battery module assembly according to claim 1, wherein each of the secondary battery cells comprises a plate-shaped battery cell.

14. The battery module assembly according to claim 1, wherein each of the battery modules is further provided with a thermally conductive member extending to at least a region contacting a corresponding one of the cooling members so as to improve thermal conductivity from the battery modules to the cooling members.

15. The battery module assembly according to claim 1, wherein the battery module assembly is used as a power source for electric vehicles, hybrid electric vehicles or plug-in hybrid electric vehicles.

* * * * *